United States Patent
Jaladanki et al.

(10) Patent No.: US 9,280,514 B1
(45) Date of Patent: Mar. 8, 2016

(54) OPTIMIZING TESTABILITY OF NETWORK DEVICES USING MARKUP LANGUAGE BASED OUTPUT

(75) Inventors: Malyadri Jaladanki, San Jose, CA (US); Surya P. Rao, San Jose, CA (US); Gilbert Levesque, Palo Alto, CA (US)

(73) Assignee: Tellabs Operations, Inc., Naperville, IL (US)

( * ) Notice: Subject to any disclaimer, the term of this patent is extended or adjusted under 35 U.S.C. 154(b) by 746 days.

(21) Appl. No.: 13/546,435

(22) Filed: Jul. 11, 2012

(51) Int. Cl.
*G06F 15/177* (2006.01)

(52) U.S. Cl.
CPC .................................. *G06F 15/177* (2013.01)

(58) Field of Classification Search
CPC .............. H04L 29/06; H04L 29/08072; H04L 29/08981; G06F 17/2247; G06F 17/227; G06F 17/30873; G06F 17/30991; G06Q 10/107

See application file for complete search history.

(56) References Cited

U.S. PATENT DOCUMENTS

| | | | | |
|---|---|---|---|---|
| 7,200,548 | B2 * | 4/2007 | Courtney | 703/27 |
| 7,657,635 | B2 * | 2/2010 | Yip et al. | 709/228 |
| 2003/0191590 | A1 * | 10/2003 | Narayan et al. | 702/68 |
| 2003/0204578 | A1 * | 10/2003 | Yip et al. | 709/222 |
| 2005/0240664 | A1 * | 10/2005 | Chen et al. | 709/220 |
| 2007/0171834 | A1 * | 7/2007 | Sathyanarayana et al. | 370/241 |
| 2009/0031008 | A1 * | 1/2009 | Elliott et al. | 709/220 |
| 2009/0216867 | A1 * | 8/2009 | Pusateri et al. | 709/222 |
| 2010/0153527 | A1 * | 6/2010 | Venouss | 709/223 |
| 2013/0042222 | A1 * | 2/2013 | Maddela | 717/124 |
| 2013/0110472 | A1 * | 5/2013 | Chan et al. | 703/1 |

* cited by examiner

*Primary Examiner* — Peling Shaw
(74) *Attorney, Agent, or Firm* — James M. Wu; JW Law Group (57) ABSTRACT

An apparatus and method for managing and maintaining a network device are disclosed. A process performed by a router, for example, is able to generate configuration data in accordance with network configuration of the router and store the data in a memory. A converter generates human-readable representation of requested status in accordance with configuration data. For example, command line interface ("CLI") show output is generated by the converter for displaying system status. In one embodiment, a second converter is used to convert the configuration data to markup language configuration output such as extensible markup language ("XML") based CLI output. A script, in one aspect, is able to run test cases to verify network configuration in light of the markup language configuration output.

20 Claims, 8 Drawing Sheets

```
1234567890123456789012345678901234567890123456789012345678901234567890
1    EntityName      Tag1      Tag2      Tag3
2    ----------      ----      ----      ----
3    Entity1         Value11   Value12   Value13
4    Entity2         Value21   Value22   Value23
5    Entity3         Value31   Value32   Value33
```

*Automated test scripts are usually coded to parse tabular formats and look for value of a field at a certain location within the show output*

| Tag/Value | Column Start | Column End |
|---|---|---|
| EntityName | 1 | 10 |
| Tag1 | 14 | 20 |
| Tag2 | 23 | 30 |
| Tag3 | 32 | 39 |

⇩

```
1234567890123456789012345678901234567890123456789012345678901234567890
1    EntityName      Tag1      Tag2      Tag2A     Tag3
2    ----------      ----      ----      -----     ----
3    Entity1         Value11   Value12   Value12A  Value13
4    Entity2         Value21   Value22   Value22A  Value23
5    Entity3         Value31   Value32   Value32A  Value33
```

*Automated test scripts now will have to modified to look for values in column 3 at a new location in the show output*

| Tag/Value | Column Start | Column End |
|---|---|---|
| EntityName | 1 | 10 |
| Tag1 | 14 | 20 |
| Tag2 | 23 | 30 |
| Tag2A | 32 | 39 |
| Tag3 | 42 | 49 |

FIG.4B

```
<entity>
    <entity1>
        <EntityName>Entity1</EntityName>
        <Tag1>Value11</Tag1>
        <Tag2>Value12</Tag2>
        <Tag3>Value13</Tag3>
    </entity1>
    <entity2>
        <EntityName>Entity2</EntityName>
        <Tag1>Value21</Tag1>
        <Tag2>Value22</Tag2>
        <Tag3>Value23</Tag3>
    </entity2>
    <entity3>
        <EntityName>Entity3</EntityName>
        <Tag1>Value31</Tag1>
        <Tag2>Value32</Tag2>
        <Tag3>Value33</Tag3>
    </entity3>
</entity>
```
470

```
<entity>
    <entity1>
        <EntityName>Entity1</EntityName>
        <Tag1>Value11</Tag1>
        <Tag2>Value12</Tag2>
        <Tag2A>Value12A</Tag2A>
        <Tag3>Value13</Tag3>
    </entity1>
    <entity2>
        <EntityName>Entity2</EntityName>
        <Tag1>Value21</Tag1>
        <Tag2>Value22</Tag2>
        <Tag2A>Value22A</Tag2A>
        <Tag3>Value23</Tag3>
    </entity2>
    <entity3>
        <EntityName>Entity3</EntityName>
        <Tag1>Value31</Tag1>
        <Tag2>Value32</Tag2>
        <Tag2A>Value32A</Tag2A>
        <Tag3>Value33</Tag3>
    </entity3>
</entity>
```
472

OPTIMIZING TESTABILITY OF NETWORK DEVICES USING MARKUP LANGUAGE BASED OUTPUT

FIELD

The exemplary embodiment(s) of the present invention relates to network systems. More specifically, the exemplary embodiment(s) of the present invention relates to automated testing for network devices.

BACKGROUND

A high-speed network environment typically includes network devices such as routers and switches used for transferring packets and/or data traffic from sources to destinations via communication networks such as IP and/or packet-based networks. Depending on forwarding addresses, data packets are typically routed by one or more network devices or nodes via a communication network such as Internet and/or Ethernet. A conventional packet travels through many network devices before it reaches its destination. The number of network devices or nodes in a network environment may change because the configuration of the network constantly changes. For example, multiple new devices may be added while attached devices may be deactivated.

Typical network devices require monitoring, maintenance, and upgrading in order for them to performance efficiently. When a network device, for example, is upgraded with new software, the functionalities and connectivity of the device need to be verified before it can be activated or attached to the network. To verify a network device, a manual testing or automatic regression tests may be used.

For example, automated test scripts, which depend on value of a given field at a particular location within command line interface ("CLI") show output, are typically used to run or execute a set of verification tests. However, when the new software alters certain locations of values due to added parameters, the existing automated test scripts may no longer work since location of some parameters may be changed in the show output, thereby error may be flagged.

For example, a script scans an output for a specific defined string such as "Tag5" based on the location of the value within a show output. After locating "Tag5", "value5" which may be situated at a location after "Tag5" is extracted. However, the script will fail to identify "Tag5" if "Tag5" is no longer located at the previously known location within the show output due to added field(s) such as discount field or 4G field.

SUMMARY

One embodiment of the present invention discloses a script capable of verifying functionalities of a device using markup language based on show output(s). After generating configuration data relating to a network configuration of the network device, human-readable output representing requested status is converted or generated in accordance with the configuration data organized in a predefined data structure. For example, human-readable form of command line interface ("CLI") show output is displayed on a screen illustrating requested device status. In one embodiment, a converter is able to convert the configuration data to markup language based CLI show output. For example, the markup language based CLI can be extensible markup language ("XML") based CLI show output. A script, in one aspect, is enabled to run automated tests to verify network configuration and/or functions of the device in light of the markup language based output or file.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus that verifies network configuration and/or functionalities of a network device using markup language based output file.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present invention discloses a network device such as a router having a memory, a human-readable output converter, a machine readable output converter, and a test script. The script is used to verify functionalities of the device using machine readable markup language based show output(s). After generating configuration data relating to a network configuration of the network device, human-readable output representing requested status is converted or generated in accordance with the configuration data organized in a predefined data structure. For example, human-readable form of command line interface ("CLI") show output is displayed on a screen illustrating requested device status. In one embodiment, a converter is able to convert the configuration data to markup language based CLI show output or file. For example, the markup language based CLI can be extensible markup language ("XML") based CLI show output. A script, in one aspect, is enabled to run automated tests to verify network configuration and/or functions of the device in light of the markup language based output or file.

Figure 1:
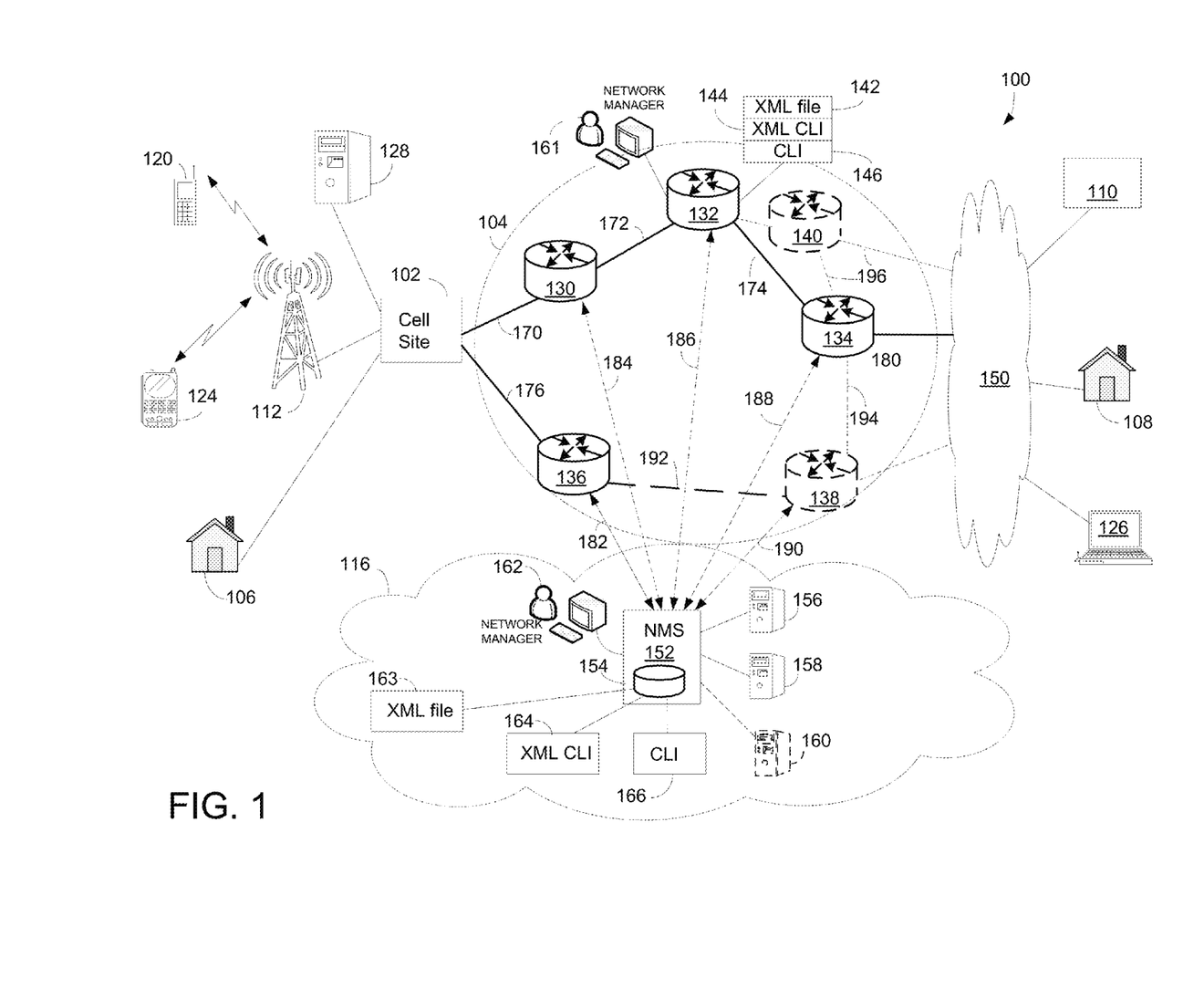
FIG. 1 is a block diagram illustrating a network configuration having multiple network devices and/or nodes in accordance with one embodiment of the present invention.

FIG. 1 is a block diagram 100 illustrating a network configuration having multiple network devices and/or nodes in accordance with one embodiment of the present invention. Diagram 100 includes a cell site 102, a switching network 104, a central office ("CO") 116, and Internet 150. Internet 150 is further coupled to a user 108, a content provider 110 such as a website, and a host 126. CO 116 provides network management to facilitate network communication between users 106-108 via switching network 104, Internet 150, and cell site 102. It should be noted that the underlying concept of the exemplary embodiment(s) of the present invention would not change if one or more blocks (or devices) were added to or removed from diagram 100.

Cell site 102 is capable of communicating with mobile devices such as cellular phone 120 and handheld device 124 via radio tower 112. It should be noted that cell site 102 may include additional radio towers as well as other land based switching circuitry. The cell stations such as cell site 102 can be configured to support wireless communications as well as wired communications.

Switching network 104 is configured to route information (or data packets) between users and/or providers connected to the network. Network 104 includes network elements ("NEs") 130-140 which are also known as nodes and/or routers. An NE, as a logical network entity, is able to manage one or more physical network devices. The physical network devices include routers, modems, hubs, bridges, servers, switches, et cetera. NEs 130-140 are interconnected via connections 170-176 and are used for routing information and/or data packets to and from network clients and/or hosts. Network client in one example may include one or more routers, switches, hosts, users, base stations, and the like. For example, switching network 104 uses NEs 130-134 to route a packet stream from users 106 to 108 via cell site 102 and Internet 150.

In one embodiment, each NE or router includes a memory, a human-readable output converter, a machine readable output converter, and a test script. While human-readable output converter is able to generate CLI show output based on earlier stored configuration data associated with the NE, the machine readable output converter converts the configuration data to XML based CLI output or output files. Once XML based CLI output is available, automation test scripts or scripts automatically run a regression test based on XML based CLI show output.

NEs 130-140, in one aspect, can be routers, switches, bridges, or a combination of routers, switches, and bridges. The total number of NEs used in switching network 104 may increase or decrease over time depending on the demand of network services. For example, with increasing demand of video streaming, the number of NEs as illustrated in diagram 100 can grow to meet such demand. One aspect of network growth is to add additional NEs into an existing pool of NEs to expand processing and/or service capacity. For instance, NEs 138-140 are recently added NEs to the pool of NEs 130-136 for enhancing routing or processing capacities. The number of NEs can grow into hundreds or thousands depending on the network service demand. Dotted lines of NEs 138-140 as well as connections 192-196 illustrate that they are newly added or will be added. It should be noted that NEs can also be generally referred to as network devices and/or network systems.

During an exemplary operation, when user 106 sends a packet to user 108, the packet travels from cell site 102 to routers 130-134 via connections 170-174. After the packet enters Internet 150 via connection 180, it is subsequently received by user 108. To route and facilitate data traffic efficiently, NEs 130-140 in switching network 104 are required to be managed, monitored, and maintained. To monitor network performance, CO 116 using, for example, a network management system ("NMS") 152 to monitor status of every NE within switching network 104.

CO 116, in one example, includes NMS 152, computers or servers 156-158, network administrator 162. NMS 152, in one aspect, further includes a database 154 having well-defined data structure, XML converter 164, and CLI converter 166. DB 154 is used to store configuration data associated with NEs 130-140. CLI converter 166 is able to generate human-readable information or representation displayable on a computer screen in accordance with configuration data stored in DB 154. XML converter 164 is able to converts stored configuration data to XML file 163 which for example can be used by a machine or system. The configuration data or network configuration data is network information relating to a particular network device or NE. For example, configuration data for a network device may include device's connectivity, active circuits/channels, interfaces, et cetera. It should be noted that some or all functions of NMS 152 can be relocated to each NE whereby every NE or router is able to monitor and maintain its performance.

In an alternative embodiment, an NE such as NE 132 is configured to have a well-defined data structure, XML converter 144, and CLI converter 146. CLI converter 146 is able to generate human-readable information or representation displayable on a computer screen in accordance stored configuration data. XML converter 144 is able to converts stored configuration data to XML file 142 which for example can be used by a machine or system. It should be noted that the embodiment of the invention can be implemented in either NEs or NMS or both.

CLI is an interface between a user and a digital processing based machine. For example, a user is able to enter text-based commands at certain location of screen facilitated by software residing on top of the machine such as operating system. Since it is a text-based format, entered text needs to appear in fixed locations in order for the machine to understand the command(s). For example, when a user enters a command of show interfaces, the operating system displays a predefined human-readable representation to indicate current status of interfaces.

XML converter 164, in one embodiment, is able to generate machine readable output or a file in accordance with the configuration data. XML is a markup language in a well defined format that can be both human-readable and machine-readable. Because XML or any other types of markup language has a well-defined syntax, a test script can scan the XML based output file and extract needed values and/or parameters to run its automated test cases. The output of XML converter 164, for example, may be fed to computers or servers 158-160 for performing automatic regression tests when one or more of predefined conditions have occurred. The conditions, for example, include new software upgrade, newly added device(s), recently removed devices, and the like.

A test script(s) is a computer program containing various executable test instructions and can be executed on a network device or NE under test to verify that the device functions as expected. Automated testing scripts are testing programs for testing at least a portion of the functionality of an NE under test. Note that test scripts can be written using GUI test tool or programming language such as C++, C#, Java, Python, TCL, PERL or Ruby. It should be noted that test automation uses a formalized testing process.

Servers or computers 156-158 can be any types of digital processing servers, personal computers ("PCs"), workstations, et cetera, and are configured to perform automated test scripts running various tests automatically. It should be noted that some or all functions of NMS 152 may be integrated to each NE. Alternatively, a group of NEs are managed by NMS 152.

The advantage of employing XML CLI converter 164 is that it enables smarter automation test scripts to scan and extract values from XML based CLI show outputs for system verification. Also, XML based CLI outputs can be built for automated test scripts to test legacy functionality.

Figure 2:
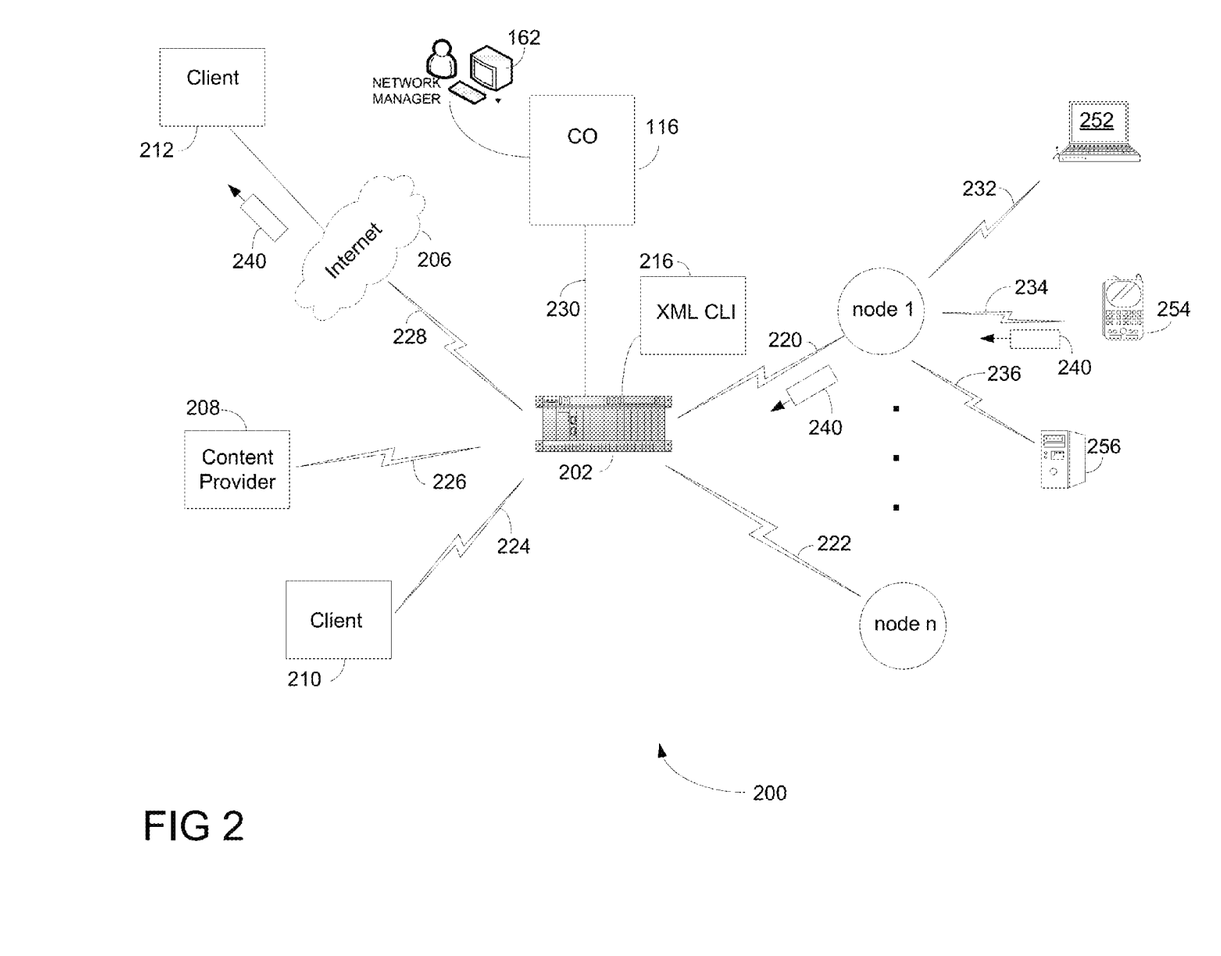
FIG. 2 is block diagram illustrating a simplified exemplary network layout including a router which uses Markup language based CLI output file to verify device functionality in accordance with one embodiment of the present invention.

FIG. 2 is a block diagram 200 illustrating a simplified exemplary network layout including a router 202 which uses XML based CLI output or file to verify device functionality in accordance with one embodiment of the present invention. Diagram 200 includes router 202, CO 116, content provider 208, clients 210-212, and network nodes. Network nodes, also known as nodes or devices, include node 1 through node n wherein n can be any integer number. In a communications network, a physical network node can be an NE or a cluster of network devices, such as a router, modem, hub, bridge, switch, handset, computer, server, workstation, et cetera. Node 1, for example, can be a network entity configured to couple to host 252, portable device 254, and server 256 via connections 232-236. It should be noted that the underlying concept of the exemplary embodiment(s) of the present invention would not change if one or more blocks (or devices) were added to or removed from diagram 200.

Router 202, which can also be a switch or bridge, is able to direct traffic flows between nodes and/or clients 210-212. A network manager or administrator 162 manages and monitors network or router performance via CO 116. In one aspect, CO 116 is coupled to router 202 via connection 230. Alternatively, CO 116 can be configured to reside within router 202. Router 202 can also be configured to provide routing services to remote clients such as client 212 via Internet 206. Connections 220-228, which can be wired, wireless, or a combination of wired and wireless cables or connections, are employed to connect router 202 to clients 210-212, content provider 208, and nodes. Note that client(s) can be servers, routers, switches, computers, user's equipments, network equipments, network elements, websites, and so forth.

To maintain system integrity, router 202 needs to be continuously monitored and maintained. For example, router 202 can be configured to use XML CLI module 216 to generate XML based CLI show output(s) and verifies router's functionalities in accordance with XML based CLI show output. When XML based CLI show output(s) becomes available, automated test scripts, for example, extract parameters (or test values) from XML based CLI show output and run a set of predefined test cases based on extracted parameters for device verification. Depending on the test case results, a recovery process may be initiated to fix errors or bugs.

One advantage of using XML based CLI show outputs or output files is that the automated test scripts can rely on XML syntax to accurately retrieve test values from XML based output. Note that XML based CLI output reduces the need for preserving the output format, location and order of various values within the show output whereby simplifying automated test case applicability. It should be noted that outputting in the format of XML and running scripts based on XML output simplify test automation whereby minimizing work load for device maintainability.

Figure 3:
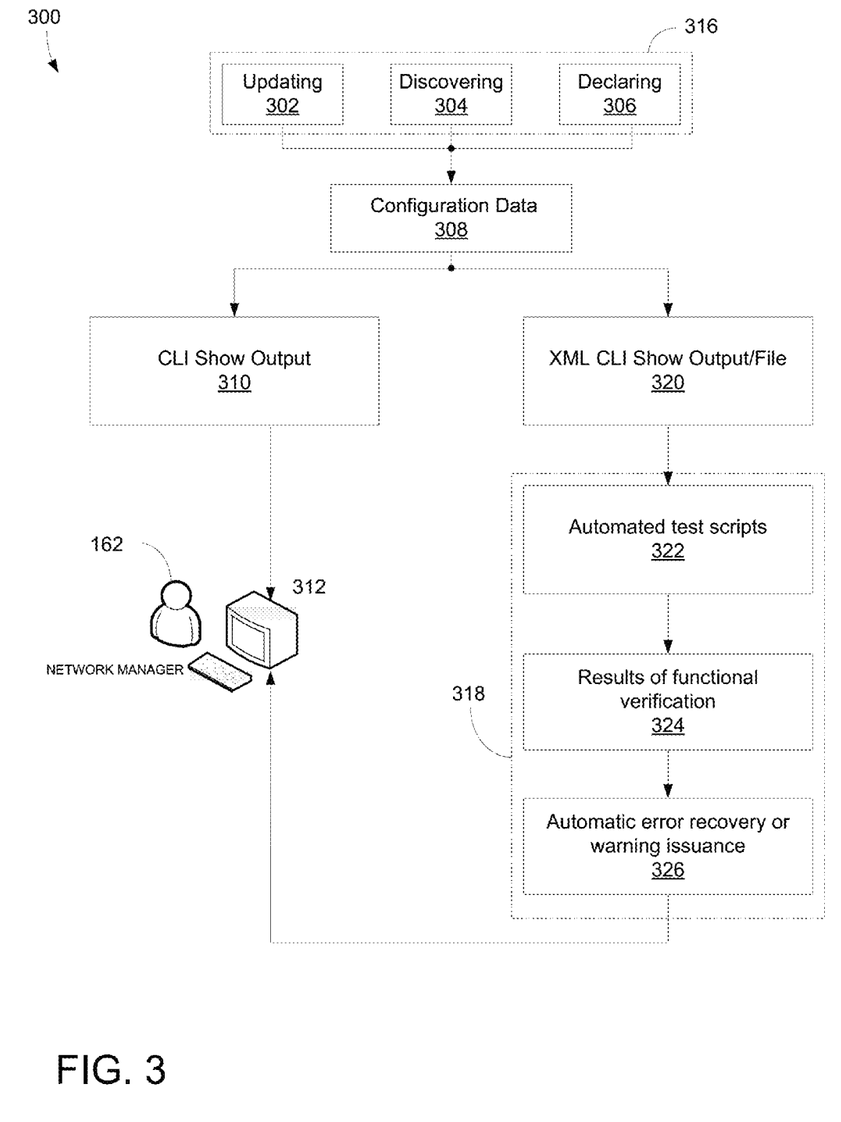
FIG. 3 is a block diagram illustrating a logic process of a network device capable of running automated test cases based on XML based CLI outputs in accordance with one embodiment of the present invention.

FIG. 3 is a block diagram 300 illustrating a logic process of a network device capable of running automated test cases based on XML based CLI outputs or File in accordance with one embodiment of the present invention. Diagram 300 illustrates a simplified network environment for a network device or router having various components such as configuration identifier, memory or storage, human-readable status output generator, machine-readable status output generator, and tester. A network operator, not shown in FIG. 3, monitors device performance using OAM (Operation, Administration, Maintenance) via management interfaces and automated testing scripts. It should be noted that the underlying concept of the exemplary embodiment(s) of the present invention would not change if one or more blocks (or devices) were added to or removed from diagram 300.

A router, in one embodiment, includes a processor, configuration identifier 316, memory 308, CLI converter 310, XML CLI converter 320, and script 318. Configuration identifier 316 includes an updating module 302, discovering module 304, and declaring module 306 used to update status of router configuration. During initialization, discovery module 304 initiates a discovery process identifying relevant network configuration(s) for the router. For instance, discovery module 304 identifies which node(s) or interfaces that the router is connected with. Updating module 302 is used to periodically scan network configuration to verify any added devices as well suspended devices associated with the router. Declaring module 306 is used to declare or to announce an establishment of new interface or connectivity for the router.

Memory 308 stores configuration data formatted according to a predefined data structure representing network configuration of the network device (or router). Memory 308 is located within the network device. Alternatively, memory 308 can reside at a remote location logically connected to the router. In one aspect, the data structure is organized in a human-readable format including multiple fields containing information relating to connections and interfaces.

Human-readable status output generator or CLI converter 310, in one example, includes a converter able to convert the configuration data to a human-readable format. For example, human-readable format can be displayed or outputted to a computer screen 312 showing user requested status organized, for instance, in the CLI show output. The CLI show output, for example, is subsequently viewable by administrator 162 via computer screen 312. It should be noted that the user requested status can be issued by administrator 162.

Machine-readable status output generator or XML CLI converter 320, in one embodiment, includes an XML converter that is able to convert the configuration data to markup language configuration output such as XML based CLI show output. It should be noted that other type of markup language may be used in place of XML to show requested status. Since output generated by markup language is not location-based output, test scripts can identify and use newly inserted values in the markup language output for regression test without causing errors, failures, and/or hiccups.

Tester or script 318, in one aspect, includes test scripts or scripts that are able to extract values or test values from the markup language configuration output. After obtaining the test values, device verification test is automatically executed based on the test values as indicated by numeral 322. For example, the test script obtains at least a portion of test values from XML based CLI show output and executes a set of predefined automated test cases in response to the portion of test values for device verification. Upon generation of verification results as indicated by numeral 324, an error recovery process may be initiated if an error is discovered. Alternatively, a warning flag may be issued if an unrecoverable bug is identified as indicated by numeral 326. Note that the result of tester 318 may be fed to computer 312 to notify administrator 162.

Figure 4A:
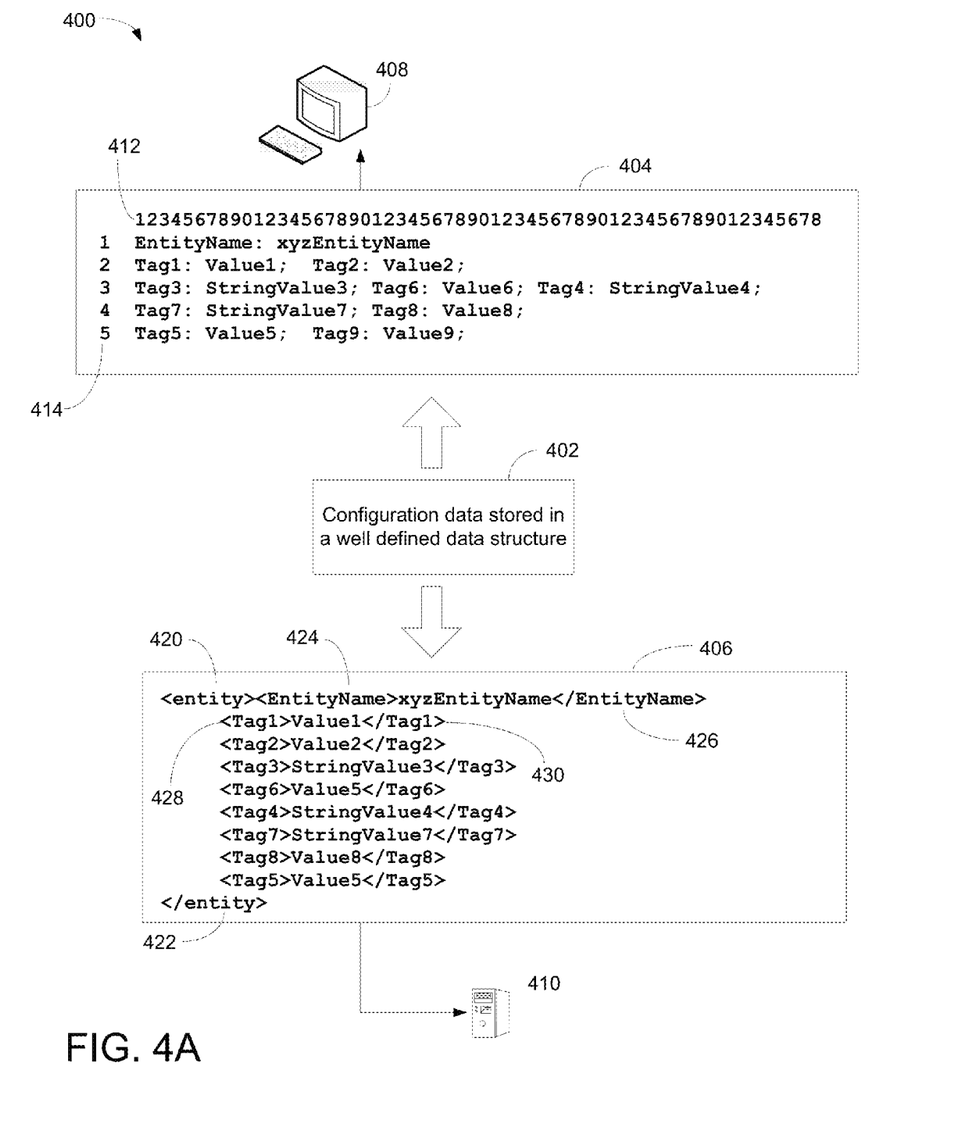
FIGS. 4A-C are block diagrams illustrating exemplary comparisons between XML based output and CLI output in accordance with one embodiment of the present invention.

FIG. 4A is a block diagram 400 illustrating an exemplary comparison between XML CLI output and CLI output in accordance with one embodiment of the present invention. Diagram 400 includes a storage 402, a human-readable CLI show output 404, and a machine-readable XML based CLI show output 406. Human-readable CLI show output 404 is generated from configuration data stored in storage 402 and the output is displayed at a computer screen 408 for a user to view. Machine-readable XML based CLI show output 406 is also generated in accordance with configuration data stored in storage 402 and the output of machine-readable format is, for example, fed to a server for regression test. Depending on the markup language used, machine-readable XML based CLI show output 406 may also be readable by a user. Note that outputs 404-406 represent the same information with different formats.

Human-readable CLI show output 404 illustrates column numbers 412 and row numbers 414 wherein location of each value identified by specific location within the show output is important. For example, "Tag1:" has to be located starting at column 1 and row 1, and value 1 will be identified after are term "Tag1:" and before the semicolon ";". To run a regression test, a test script searches every test value at exact location within the show output. If, for example, "Tag6" and "Tag4" switch their positions, the test script is likely to crash or present erroneous results.

Machine-readable XML based CLI show output 406 includes tags 420-422, and sub-tags 424-426. For example, value1 is located between a starting tag 428 and an ending tag 430. In an operation, the test script searches for "starting tag" and when it is located, the relevant value is located between the "starting tag" and "ending tag." As such, if, for example, "value5" and "stringvalue4" switch their positions, the test script using XML based CLI show output 406 is likely to identify them properly. Note that output 406 is fed to a server or network device 410 to run verification or regression test.

Regression test, for example, is a group of test cases based on multiple subroutines designed to identify errors and/or bugs after one or more updates have installed to the system, such as, but not limited to, enhancements, patches, fixes, updates, new software, and/or configuration changes. The regression scripts, in one aspect, are programmed to look for XML tags that remain unchanged across software versions whereby the test scripts are not required to be modified just because the locations of fields (or values) have been altered. Note that the location of field can be easily adjusted in XML data structure when a new field is added to or an old field is removed from an existing network configuration of a router.

Figure 4B:
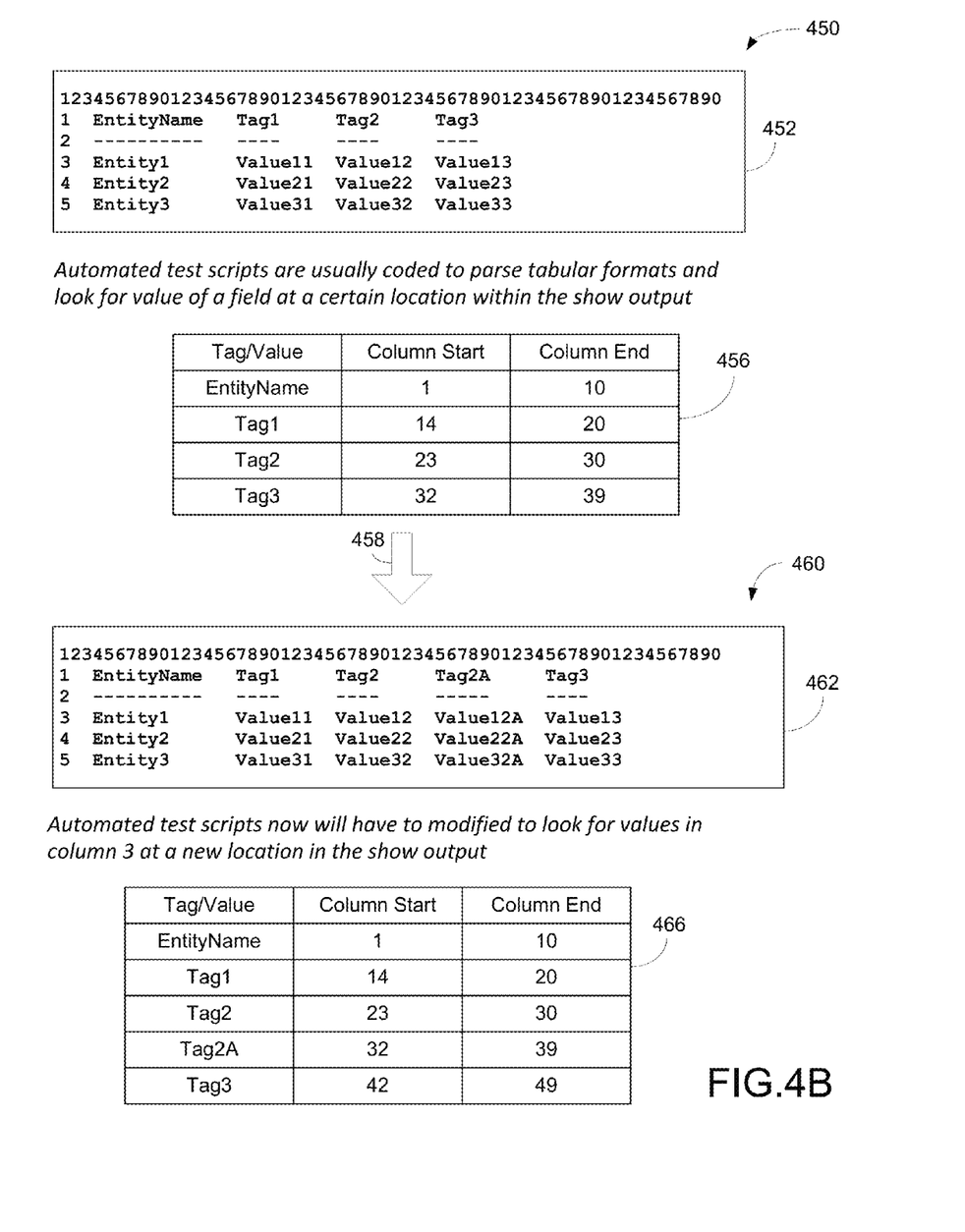
Figure 4C:
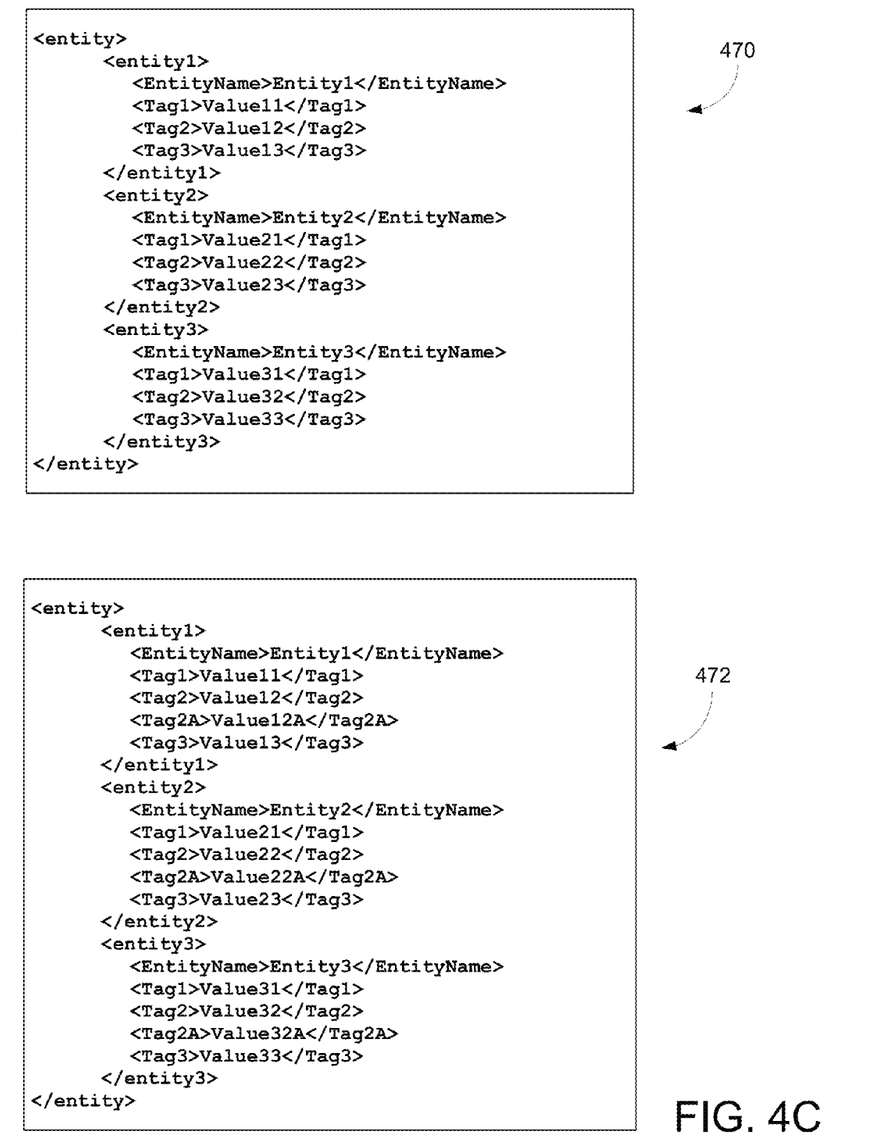

FIGS. 4B-C are block diagrams illustrating exemplary comparisons between XML CLI output and CLI output in accordance with one embodiment of the present invention. Diagram 450 shows a tabular based output 456 of a given show command. Automated test scripts for instance parses tabular based output or formats 456 and look for value of fields at certain locations such as illustrated in table 456 within the show output 452.

When an enhancement in software requires a presentation of an extra column of new data in the existing show output 462 transitioning from show output 452 as indicated by arrow 458. The existing automated script which relies on traditional show output will likely to fail due to the shift in values in column 3 to a new location. Changes to the automation script needs to be made hand-in-hand along with the software change to ensure that the automated script works. For instance, location table 466 for automated script needs to be updated from location table 456.

For the XML based output 470, however, there is no notion of the location of various fields in the show output and each field and value is recognized by a unique tag within a given block of data. For example, a change described above results in addition of new tags as illustrated in output 472 to the existing blocks. The existing automated script will continue to work in processing the old fields as well as new fields correctly since XML is based on tags instead of locations. Note that modification for automated script may be made later to recognize and process the new fields/tags.

An advantage of using XML based approach is that it allows regression script developers to follow their development timeline without having to worry about the changes introduced in new software. It should be noted that relying on the traditional CLI output to automate regression test(s) could bring the automation cycle to a grinding halt when changes are made to the existing output. Until the new changes are incorporated in the existing automated scripts to recognize the change(s) in the output, the automation cycle cannot proceed. Note that the change(s) may be involved in moving some known or existing fields to new locations in the output.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
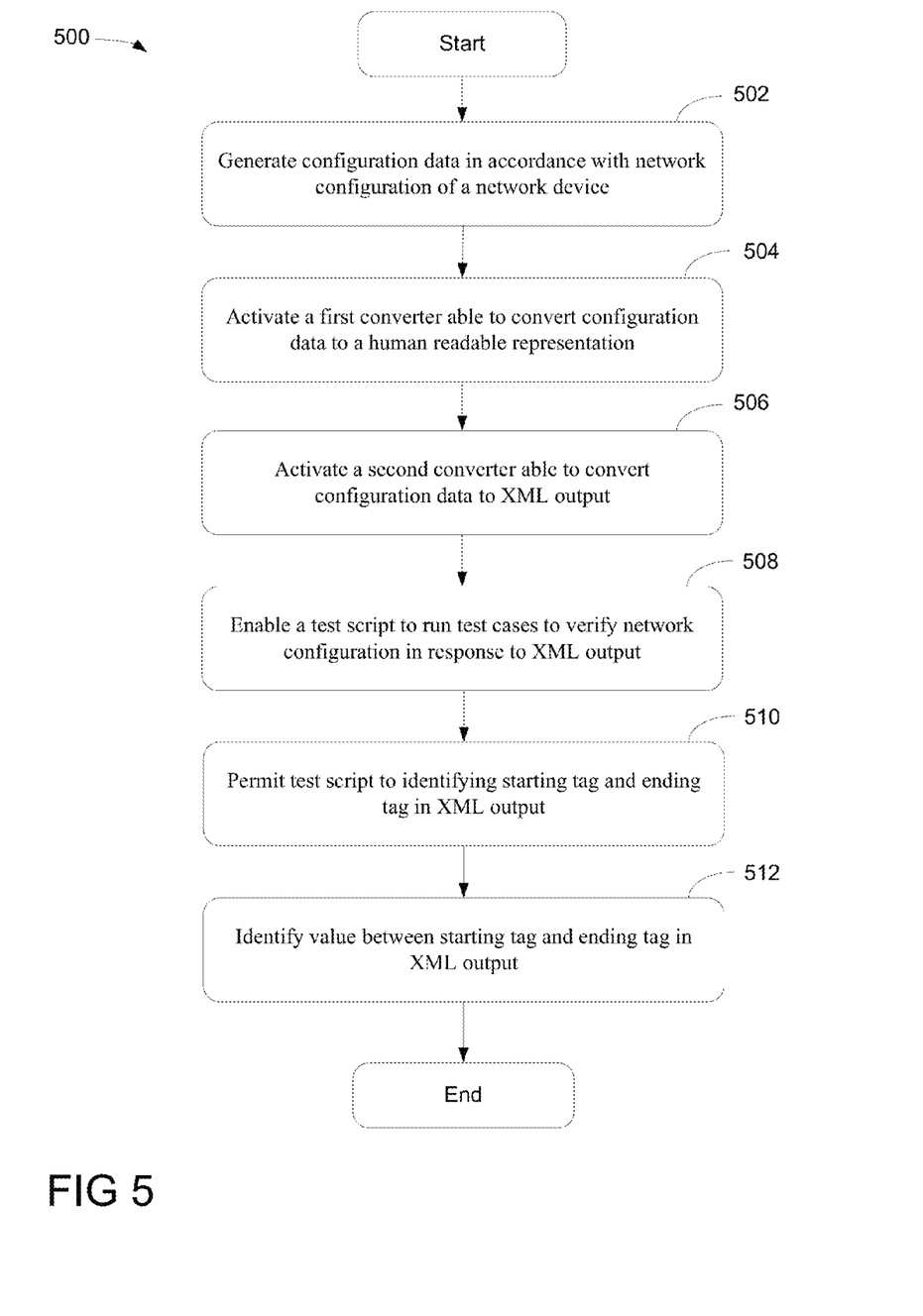
FIG. 5 is a flowchart illustrating a process that enables automation test scripts using XML based CLI output files in accordance with one embodiment of the present invention.

FIG. 5 is a flowchart 500 illustrating a process for enabling automation test scripts using XML based CLI output files in accordance with one embodiment of the present invention. At block 502, a process for monitoring, managing, and maintaining a device is capable of generating configuration data in accordance with network configuration of the network device. In one aspect, the network configuration of the network device can be identified in accordance with node connections and interfaces discovered via a discovery process. The information relating to network configuration is generated according to a well-defined data structure which is stored in a memory. Note that network configuration contains various parameters such as nodes, interfaces, connectivity, and/or entities associated with the device or router.

At block 504, the process activates a converter converting the configuration data to a human-readable representation or format. For example, device status requested by a user or administrator may be displayed on a display screen via CLI show output.

At block 506, the process activates a markup language converter able to convert the configuration data to markup language configuration output. For example, the configuration data is presented in an XML based CLI show output.

At block 508, a test script is enabled to run test cases to verify various functionalities of the network device in response to the markup language configuration output. For example, automation test scripts are allowed to search and obtain at least a portion of the configuration data formatted in XML based CLI show output.

At block 510, after identifying a first starting tag and a first ending tag in the markup language configuration output, the process at block 512 identifies the first value between the first starting tag and the first ending tag in the markup language. It should be noted that the process further allows the test script to obtain a second value between a second starting tag and a second ending tag in the markup language configuration output. Note that the network device should be first provisioned to allow an automation test script to extract test values from XML based CLI show outputs.

Figure 6:
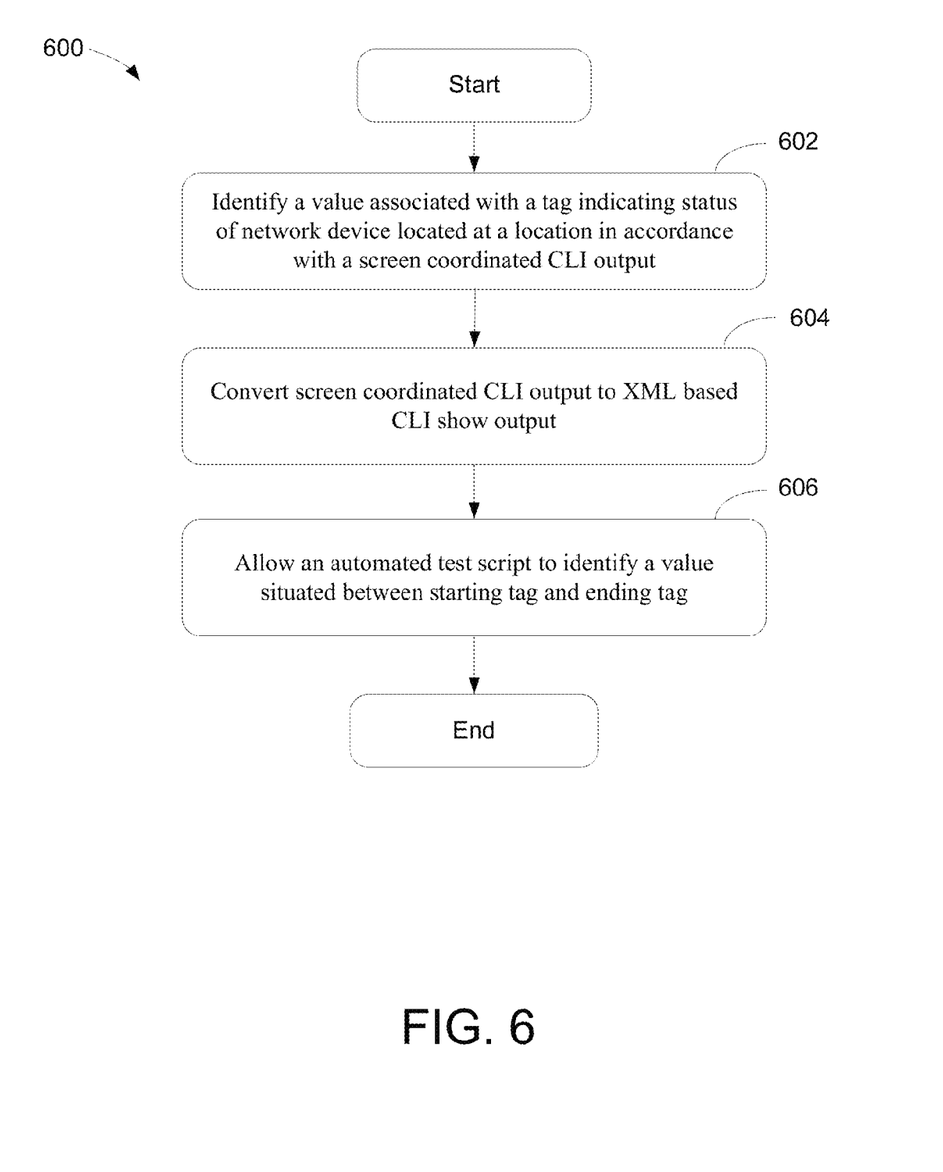
FIG. 6 is a flowchart illustrating a process that generates XML based CLI show outputs from human-readable CLI output in accordance with one embodiment of the present invention.

FIG. 6 is a flowchart 600 illustrating a process for generating XML based CLI show outputs from human-readable CLI output in accordance with one embodiment of the present invention. At block 602, a process for maintaining a router is capable of identifying a first value associated with a first tag indicating first status of the network device located at a first location in accordance with a human-readable format CLI output.

At block 604, the human-readable format CLI output is converted to an XML based CLI show output. Note that network configuration of the network device is identified based on node connections and interfaces identified during a discovery process. In one embodiment, the network device is initially provisioned to allow automation test scripts to extract test values from XML based CLI show output.

At block 606, the process allows an automated test script to identify the first value situated between a first starting tag and a first ending tag. The first starting tag indicates the beginning of first value and the first ending tag indicates the ending of the first value. The process is further capable of allowing the automated test script to identify the second value situated between the second starting tag and the second ending tag.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for managing a network device, comprising:
generating configuration data in accordance with network configuration of the network device;
activating a first converter to convert the configuration data to a human-readable format representing at least a portion of status;
activating a second converter to convert the configuration data to markup language configuration output with each value located between a starting tag and an ending tag representing at least a portion of status; and
enabling a test script to run a plurality of test cases to verify the network configuration and functionalities of the network device in response to the markup language configuration output.

2. The method of claim 1, further comprising:
permitting the test script to identify a first starting tag and a first ending tag in the markup language configuration output; and
identifying the first value between the first starting tag and the first ending tag in the markup language configuration output.

3. The method of claim 2, further comprising allowing the test script to obtain a second value between a second starting tag and a second ending tag in the markup language configuration output.

4. The method of claim 1, further comprising provisioning the network device to allow an automated test script to extract a plurality of testing values from extensible markup language ("XML") based command line interface ("CLI") show outputs.

5. The method of claim 1, further comprising:
identifying network configuration of the network device in accordance with node connections and interfaces identified during a discovery process; and
generating the configuration data in accordance with a data structure.

6. The method of claim 1, wherein generating configuration data in accordance with network configuration of the network device includes identifying parameters relating to one or more nodes or interfaces.

7. The method of claim 6, wherein generating configuration data in accordance with network configuration of the network device includes identifying network connectivity and entities associated with a router.

8. The method of claim 7, wherein activating a first converter to convert the configuration data to a human-readable format representing at least a portion of status includes displaying requested device status on a display screen via command line interface ("CLI") show output.

9. The method of claim 8, wherein activating a second converter to convert the configuration data to markup language configuration output representing at least a portion of status includes presenting the configuration data in an extensible markup language ("XML") based CLI show output.

10. The method of claim 9, wherein enabling a test script to run a plurality of test cases includes allowing automated test scripts to search and extract a portion of the configuration data formatted in XML based CLI show output.

11. A method for maintaining a network device, comprising:
identifying a first value associated with a first tag indicating first status of the network device located at a first location in accordance with a human-readable format command line interface ("CLI") output;
converting the human-readable format CLI output to an extensible markup language ("XML") based CLI show output with each value situated between a starting tag and an ending tag; and
allowing an automated test script to identify the first value situated between a first starting tag and a first ending tag.

12. The method of claim 11, further comprising:
identifying a second value associated with a second tag indicating second status of the network device located at a second location in accordance with a second human-readable format CLI output;
converting the second human-readable format CLI output to a second XML based CLI show output; and
allowing the automated test script to identify the second value situated between a second starting tag and a second ending tag.

13. The method of claim 12, wherein allowing the automated test script to identify the first value includes identifying a first starting tag indicating beginning of the first value, and identifying a first ending tag indicating ending of the first value.

14. The method of claim 11, further comprising provisioning the network device for allowing the automation test scripts to extract a plurality of test values from XML based CLI show output.

15. The method of claim 11, further comprising:
identifying network configuration of the network device in accordance with node connections and interfaces identified during a discovery process; and
generating the configuration data in accordance with a data structure.

16. A network device having a processor and memory, comprising:
a memory storing configuration data formatted according to a predefined data structure representing network configuration of the network device;
a first converter coupled to the memory and able to convert the configuration data to a human-readable form;
a second converter coupled to the memory and able to convert the configuration data to markup language configuration output with each value located between a starting tag and an ending tag; and
a test script coupled to the second converter and able to extract a plurality of values from the markup language configuration output for device verification test.

17. The network device of claim 16, wherein the data structure includes a plurality of fields containing information relating to connections and interfaces.

18. The network device of claim 16, wherein the human-readable form is a computer screen displayable representation showing requested status via command line interface ("CLI") show output.

19. The network device of claim 16, wherein the markup language configuration output is extensible markup language ("XML") based command line interface ("CLI") show output showing requested status.

20. The network device of claim 19, wherein the test script obtains at least a portion of test values from XML based CLI show output and executes automated predefined test cases in response to the portion of test values for device verification.

* * * * *